United States Patent Office 3,581,343
Patented June 1, 1971

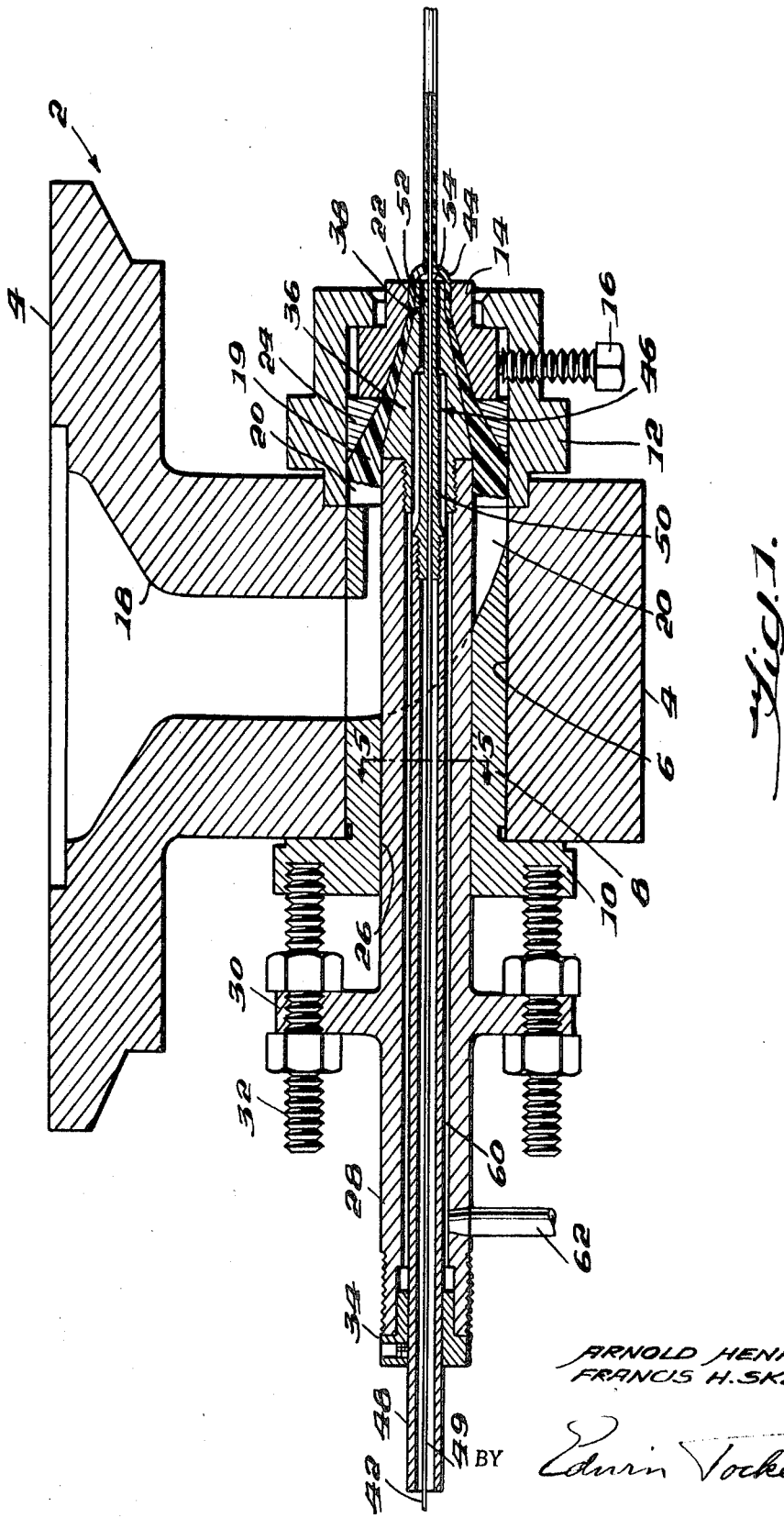

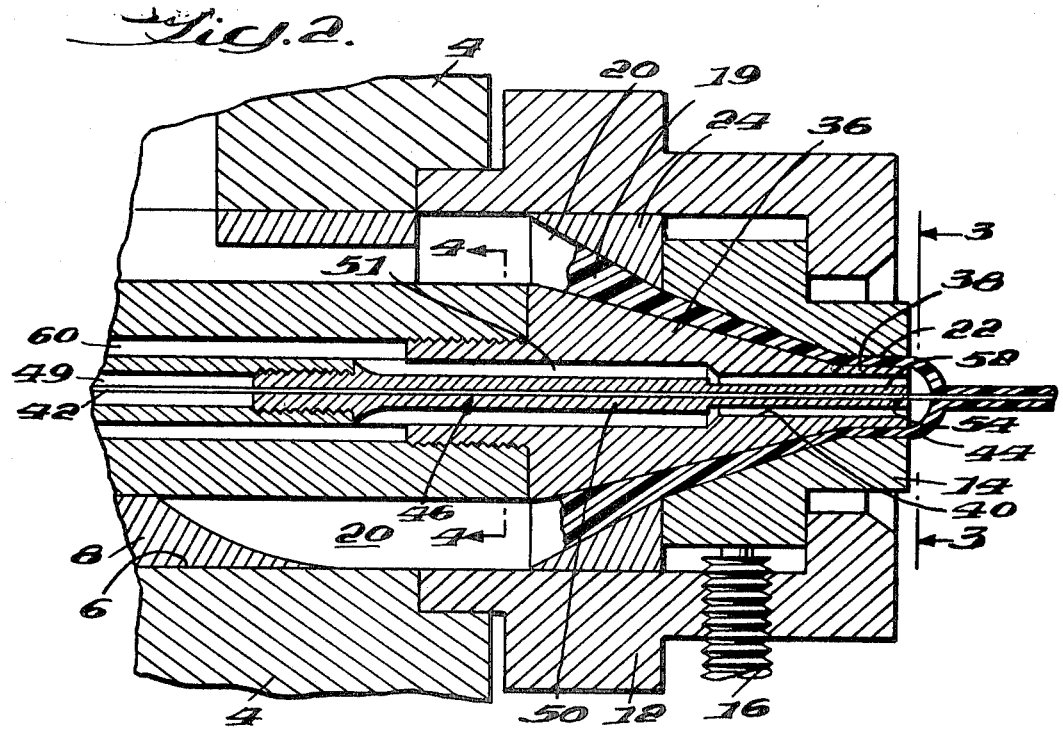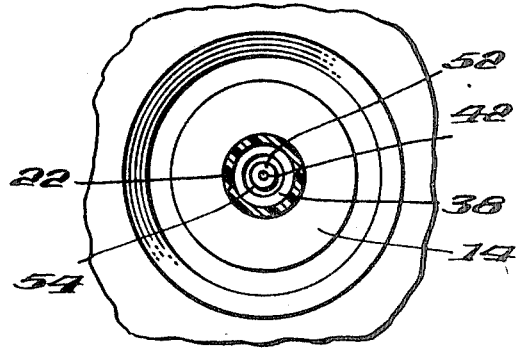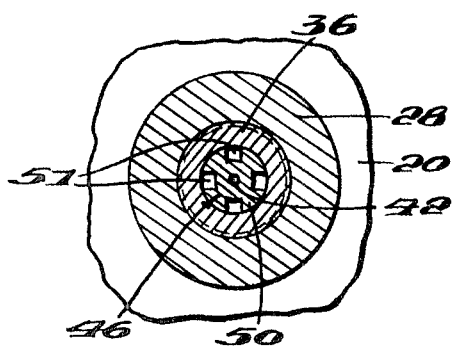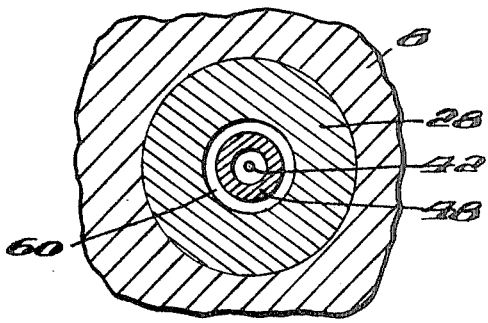

3,581,343
TUBING DIE EXTRUSION COATING APPARATUS
Arnold Henrikson, Newark, and Francis H. Skewis, Wilmington, Del., assignors to E. I. du Pont de Nemours and Company, Wilmington, Del.
Filed Oct. 25, 1968, Ser. No. 770,674
Int. Cl. B29f 3/10
U.S. Cl. 18—13                                12 Claims

ABSTRACT OF THE DISCLOSURE

A separate guide structure is positioned within the guide tube of a tubing die extrusion coating apparatus for extrusion coating elongate material with thermoplastic resin, with the separate guide structure dividing the interior of the guide tube into a guide passage for elongate material passing through the guide tube and a vacuum chamber annularly surrounding the guide passage, with the guide passage terminating in laterally spaced relationship within the outlet of the guide tube, whereby the space between the guide passage and the outlet of the guide tube insures free communication of the vacuum within the vacuum chamber of the guide tube with tubing of thermoplastic resin extruded by the apparatus.

---

This invention relates to an improvement in extrusion coating elongate material with thermoplastic resin using a tubing die.

There are two general types of extrusion coating apparatus for coating elongate material with thermoplastic resin; namely, pressure die apparatus and tubing die apparatus. In both types of apparatus, a die body is present containing a cavity full of molten thermoplastic resin under extrusion pressure, with the cavity terminating in an extrusion orifice through which the resin is extruded. A guide tube is provided to guide the elongate material through the cavity and center it with respect to the extrusion orifice. In the pressure type extrusion coating apparatus, the guide tube extends only part way through the cavity. Extrusion pressure brings the resin into contact with the elongate material and the resin and the elongate material exit the extrusion orifice in contact with one another. The extrusion pressure contact of the resin with the elongate material tends to deflect the elongate material to a degree depending on pressure non-uniformity and its thickness, giving mis-centering, as well as to penetrate the elongate material wherever areas of low pressure resistance, such as openings or liquid coatings, exist. In addition, the elongate material is exposed to the molten resin condition during travel from the outlet of the guide tube to the extrusion orifice.

In the tubing die extrusion coating apparatus, the guide tube extends entirely through the die cavity, terminating in an outlet within the extrusion orifice. The outer surface of the guide tube (within the extrusion orifice) and the extrusion orifice form an annulus through which the molten resin is extruded as tubing having a larger inner diameter than the diameter of the elongate material being coated. After emergence from the annulus, the tubing is drawn down onto the elongate material by a vacuum which is drawn through the guide tube. In the tubing die apparatus, the extrusion pressure, which is generally at least several hundred p.s.i., is expended on forcing the resin through the annulus, and it is only the pressure differential between atmospheric pressure and the vacuum being drawn that brings the tubing into contact with elongate material. This much lower pressure makes the tubing die especially suited for applications where centering of the elongate material within the coating is a problem, which increases with decreasing diameter of the elongate material, and where penetration of the resin into the elongate material is undesirable. The tubing die also minimizes the contact time of the elongate material with molten thermoplastic resin since the resin does not contact the elongate material until after it leaves the extrusion annulus.

The tubing die apparatus for extrusion coating does not always satisfy the degree of centering desired. Since vacuum must be supplied through the guide tube to draw the tubing down onto the elongate material, there must be some clearance provided between the outlet of the guide tube, which is the guide surface for the elongate material, and the elongate material passing through the outlet. The elongate material is thus free to wobble within the clearance provided at the guide tube outlet, imparting a corresponding variation in centering of the elongate material within the resin coating. If the spacing between the guide tube outlet and elongate material is too tight, so as to improve centering, interruptions of the vacuum communication occur, causing thick spots in the resin coating. This problem is further aggravated if the elongate material is coated with a substance which tends to build up within the outlet of the guide tube, periodically shutting off vacuum communication to the exterior of the die. The balance that has to be struck between centering and the need for vacuum to cause uniform draw-down of the extruded tubing onto the elongate material limits the speed at which the coating operation can be conducted.

The present invention provides a modification of a tubing die extrusion coating apparatus for coating elongate material with thermoplastic resin, which provides a high degree of centering while insuring vacuum communication for draw-down purposes, to thus enable a higher quality product to be produced at a greater speed. The apparatus of the present invention includes the conventional arrangement of a guide tube within an extrusion die to form a tubing die. Instead of the outlet of the guide tube forming a guide surface for elongate material, however, a guide structure is positioned within the guide tube to longitudinally divide the interior of the guide tube into a guide passage for the elongate material and an annular vacuum chamber surrounding the passage, with the guide passage terminating in an outlet which is in laterally spaced relationship within the guide tube outlet. The guide passage performs the guide function for the elongate material while the lateral spacing between guide tube and guide passage outlets performs the vacuum communication function with the exterior of the die for draw-down purposes. Since the guide function is separated from the vacuum communication function, the guide function can be performed with reduced clearance between guide passage and elongate material to provide a high degree of mechanical centering without impeding vacuum communication. Any coating of substance on the elongate material which tends to rub off is kept within the guide passage, separate from the vacuum path, so as not to interfere with the vacuum. Since vacuum communication is unimpeded by the close centering supplied to the elongate material, even if coated with a substance which tends to rub off, high rates of high quality production are possible.

The present invention will be described in further detail with reference to the drawing, in which:

FIG. 1 is a cross-section of a tubing die extrusion coating apparatus employing the improved guide tube of the present invention;

FIG. 2 is an enlarged view of a portion of FIG. 1;

FIG. 3 is a view of the extrusion orifice of the tubing die extrusion die coating apparatus, taken along line 3—3 of FIG. 2;

FIG. 4 is a cross-section taken along line 4—4 of FIG. 2; and

FIG. 5 is an enlarged cross-section taken along line 5—5 of FIG. 1.

Referring now to the drawings, FIG. 1 shows a tubing die extrusion coating apparatus 2 which can be the cross-head of a conventional extruder. The apparatus 2 comprises a cross-head block 4 having a transverse bore 6 into which a guide tube holder 8 is fitted up to its retaining shoulder 10. Abutting the opposite end of the guide tube holder is a die retainer block 12 which retains a die 14 as shown, which is laterally adjustable by a number of radially extending adjustment bolts 16 (only one shown). The die retainer block 12 is secured to the cross-head block 4 by bolts (not shown).

The cross-head block 4 contains a throat 18 which is fed molten thermoplastic resin 19 from a conventional extruder (not shown) to which the block 4 is mounted. The guide tube holder 8, die retainer block 12, and die 14 cooperate to form a cavity 20 for receiving the resin from throat 18 and the cavity conically converges to terminate in an extrusion orifice 22 in the die 14. For purposes of clarity, resin 19 is shown in the drawing as filling only a portion of the cavity, but in actual operation, the resin fills the entire cavity and throat. An annular wedge ring 24 is provided to make a smooth transition of the cavity from the die retainer block to the die.

The guide tube holder 8 has a longitudinal bore 26 into which is fitted a guide tube 28, which adjacent its rearward end has a flange 30 through which bolts 32 pass for securement of the guide tube to guide tube holder 8. The guide tube extends into the cavity 20 so as to be surrounded in annular fashion by the cavity as best shown in FIG. 4. The rearward end of the guide tube 28 is closed by a plug 34. The forward end of the guide tube 28 as best shown in FIG. 2, has a conically converging section 36, terminating in a short tubular section 38, which in turn terminates within die orifice 22, whereby orifice 22 becomes annular in shape (FIG. 3). The narrow bore of the section 36 forms the outlet of the guide tube.

Present within the guide tube 28 is a guide structure which longitudinally divides the interior of the guide tube into an annular vacuum chamber and means for guiding elongate material 42 through the guide tube free of contact therewith. In one embodiment for accomplishing this longitudinal division, the guiding means comprises an internal guider tip 46 threadably secured at one end to a tubular extension 48 of about the same diameter. The guider tip has a thick-wall tubular section 50 containing a series of longitudinal slots 51 spaced 90° apart as best shown in FIG. 4, and a thin-wall tubular section 52 (FIG. 3). Section 52 has a smaller outer diameter than the inner diameter of outlet 40, so as to be laterally spaced therefrom. The guider tip is provided with a longitudinal bore 54 through which elongate material 42 passes, with only slight clearance.

Section 50 of the guider tip forms a slip fit with a corresponding longitudinal bore in the converging section 36 of the guide tube, so as to position the guider tip 46 as well as the forward end of the tubular extension 48. The rearward end of the tubular extension is positioned in a bore through plug 34 by a transverse bolt in the plug. The inner diameter or bore 49 of the tubular extension 48, together with the bore of the guider tip, form a guide passage for the elongate material through the guide tube.

The outer diameter of the tubular extension 48 is less than the inner diameter of the guide tube so as to be laterally spaced therefrom (FIG. 5). The space between the tubular extension and the guide tube communicates with the slots 51 and, in turn, with the space between section 52 of the guider tip and the converging section of the guide tube to form vacuum chamber 60 running the length of the guide tube and opening to the exterior of the tubing die. The vacuum chamber 60 is connected to a source of vacuum (not shown) through a nipple 62 positioned through the sidewall of the guide tube. Means other than the slotted section 50 of the guider tip, such as perforated disc-like spacers can be used to space the guider tip and tubular extension or tubular means corresponding thereto from the inner surface of the guide tube and its outlet.

In operation, the elongate material is passed through the guide structure within the guide tube and out the guider tip to be enveloped by extruded tubing of thermoplastic resin of larger internal diameter coming from the extrusion annulus. A vacuum is drawn on the vacuum chamber and this vacuum is communicated to the space between the extruded tubing and the elongate material, causing the tubing to form a cone 44 in drawing down onto the elongate material to coat it.

In further detail, section 52 of the guider tip is concentrically positioned within the outlet of the guide tube so as to provide a uniform annular space for communicating the vacuum drawn on the guide tube with the interior of cone 44. This leads to uniform drawdown of the extruded tubing onto the elongate material. Since the elongate material does not enter this annular space, the elongate material no longer impedes the vacuum. The spacing between the section 52 of the guider tip and outlet 40 is sufficient to permit the vacuum communication required for draw-down under the particular conditions of operation employed. Typical spacing is a clearance of 10 to 25 mils. "Clearance" as used herein means the difference between diameters. Generally, the vacuum is 2 in. Hg or more, depending on the requirements of the coating operation.

The guider tip 46 and tubular extension 48 separate the elongate material from the vacuum chamber. If any substance that tends to rub off is present on the elongate material, such substance is also isolated from the vacuum chamber, thereby preventing its interrupting the vacuum.

The guider tip is positioned to be concentric with the extrusion annulus. Since the vacuum is separate from the elongate material, the bore 54 of the guider tip can be of reduced clearance so as to reduce wobble of the elongate material and thereby improve centering without interfering with the vacuum. Thus, the clearance between elongate material 42 and bore 54 in the guider tip can be very small, such as on the order of 2 to 10 mils. Operation with this small clearance also has the advantage of preventing any significant buildup, as occurs in a conventional guide tube, of substance which tends to rub off, if such is present on the elongate material.

A larger diameter bore in tubular extension 48 than the bore 54 can be used since centering of the elongate material at that point is not critical. However, the bore in the tubular extension is sufficiently narrow to avoid excessive build-up of any substance that may rub off from the elongate material. The resultant close fit between the elongate material and the bore of the tubular extension (relative to the clearance between the elongate material and the interior surface of the guide tube) also prevents chattering of the elongate material in passing through the guide tube. The large clearance between the elongate material and tubular extension 48 shown in the drawings is for purposes of clarity only; generally, the clearance will be less than the diameter of the elongate material.

The slip-fit of the slotted section of the guider tip in the bore in section 36 of the guide tube enables the guider tip and tubular extension to be removed as a unit. This removability enables elongate material to be threaded through this guide structure, which is then inserted into the guide tube, which is much easier and safer than threading elongate material through the guide tube in place within the tubing die.

Typically, but not necessarily, section 52 of the guider tip will terminate in about the same plane as the section 38 of the guide tube, i.e., their outlets will lie in the same plane. However, section 52 can be extended for a short distance beyond this plane for controlling the axial position of the elongate material 42 up to the last possible moment before the extruded tubing of thermoplastic resin is drawn into contact with it.

In addition to insuring vacuum communication between the vacuum chamber 60 and the interior of the cone 44, the annular space between the guider tip and the outlet 40 serves as an insulation space between the elongate material and the thermoplastic resin being extruded. Thus, if the elongate material 42 is cold relative to the temperature of thermoplastic resin, this relative coldness is not directly communicated to the guide tube to cause periodic freezing of the thermoplastic resin at the extrusion orifice. Conversely, if the elongate material or a substance coated thereon is heat sensitive, e.g., thermoplastic, exposure of the elongate material to the heat of the molten thermoplastic resin at the extension orifice is reduced.

"Elongate material" as used herein means material having a long length and a relatively small, substantially symmetrical cross-section. The elongate material can be in such forms as individual length, e.g., wire or filaments, such lengths either bundled or twisted together, e.g., strands, or strands twisted together, e.g., cables. The elongate material can be made of metals, such as steel, copper or aluminum, or of non-metals, such as glass or organic polymers, or combinations of such non-metals or such non-metals with metals.

Any organic resin which is thermoplastic so as to be extrudable can be used in the apparatus of the present invention to form coatings for elongate materials. Which thermoplastic resin is used will depend on the intended use of the coated article and on which elongate material is used. Thus, if the elongate material is itself thermoplastic, such as a thermoplastic resin, a lower melting thermoplastic resin can be used as the coating resin. With due regard for these selection criteria, representative thermoplastic resins include natural and synthetic rubbers such as thermoplastic polyurethanes, polychloroprenes, EPT sulfur-curable elastomers such as described in U.S. Pat. No. 2,933,480 to Gresham and Hunt, and copolymers of hexafluoropropylene with vinylidene fluoride and optionally tetrafluoroethylene; and such thermoplastic resins as polystyrene, high impact polystyrene, ABS resin, the saturated hydrocarbon polymers, such as polyethylene, linear or branched, polypropylene and copolymers thereof; ionic hydrocarbon polymers (ionomers) such as described in U.S. Pat. No. 3,264,272 to Rees; copolymers of ethylene with an $\alpha,\beta$-unsaturated carboxylic acid such as described in British Pat. 963,380 to Du Pont; halogenated or perhalogenated olefin polymers, such as polymers of vinyl chloride vinylidene chloride, chlorotrifluoroethylene, vinyl fluoride and vinylidene fluoride and melt fabricable tetrafluoroethylene polymers, including such co-monomers as hexafluoropropylene, perfluoroalkyl vinyl ether, e.g., perfluoropropyl vinyl ether, or the monomer described and claimed in U.S. Pat. No. 3,308,107 to Selman and Squire; polyvinyl acetate and copolymers thereof with saturated hydrocarbon polymers and optionally, the acid copolymers of British Pat. 963,380 to Du Pont; polymers of $\alpha,\beta$-unsaturated carboxylic acid, such as polymethyl-methacrylate; the polyamides such as polyhexamethylene adipamide (66 nylon), polyhexamethylene sebacamide (610 nylon), polycaprolactam (6 nylon), copolymers, ionomers and/or saturated hydrocarbon polymers; polyoxymethylene polymer and copolymer; polycarbonate polysulfone, and polyethylene terephthalate.

The apparatus of the present invention is particularly useful in coating the steel wire which has been previously coated with a liquid such as the liquid corrosion inhibitor described in U.S. patent application Ser. No. 468,832, filed July 1, 1965, by Kjellmark. When using a conventional guide tube in a tubing die, the liquid corrosion inhibitor tends to build up within and at the outlet of the guide tube, interfering with vacuum draw-down and producing lumps beneath the resin coating on the steel wire. Use of the guide structure within a guide tube according to the present invention enables the production rate to be greatly increased, producing higher quality coated wire.

Another application for which the apparatus of the present invention is especially suited is the coating of strands or cables of fine wires with thermoplastic resin. Using a conventional guide tube, difficulty is experienced in minimizing clearance between the strand or cable and its point of entry into the rearward end of the guide tube, which minimized clearance is necessary in order to maintain a vacuum through the guide tube, without breaking one or more of the fine wires. The present invention eliminates the need for such close clearance, thereby alleviating this source of wire breakage, by providing the vacuum chamber within the guide tube which is separate from the guide passage for the wire.

Still another application that is served by the apparatus of the present invention is to apply a sheath of thermoplastic resin over a fiber optic core of thermoplastic resin, such as described in Canadian Pat. No. 789,972. The annular space between section 36 of the converging section of the guide tube and section 38 of the guider tip provides insulation between the core and the molten thermoplastic resin sheath being extruded.

The following examples are intended to illustrate operation using apparatus of the present invention and are not intended as a limitation on the scope thereof.

EXAMPLE 1

A wire line equipped with a rotating reel pay-off, 2-inch diameter extruder having a conventional tubing die wire coating cross-heat (guide tube has no internal guide structure), in which the diameter of the die orifice was 0.230 inch, the guide tube outlet was 0.190 inch O.D., and 0.120 inch I.D., a 30-foot quench tank, caterpillar haul-off, and conventional take-up was used to apply a 10-mil jacket of 610 nylon resin to .080 inch steel wire previously coated with a liquid corrosion inhibitor. The nylon jacket was extruded onto the wire at a stock temperature of 517° F. and a coating speed of 158 f.p.m. A vacuum of 2 inches of mercury was applied to the core tube to draw down the melt cone. A high frequency spark tester of 2 inches of mercury was applied to the core tube to draw down the melt cone. A high frequency spark tester was used to detect breaks in the coating. Average coating thickness varied between 10 and 18 mils, and the spark tester counted 131 breaks in the 25,000 feet of wire jacket with nylon. The wire coating was rough.

EXAMPLE 2

The same wire line was used as in Example 1, with the exception that the guide tube contained internal guide structure similar to that of FIG. 1, with the I.D. of the bore 54 being .082 inch, the clearance between section 52 of the guider tip and orifice 40 being .022 inch, the diameter of bore 49 being .120 inch, the O.D. of section 38 being .210 inch, and the diameter of the die orifice being .250 inch. Again, oil pre-coated .080 inch diameter steel wire was fed through the system. The nylon stock temperature was 510° F. and coating speed 158 f.p.m. Coating thickness varied between 8 and 13 mils, with the spark tester indicated only six coating break in 21,270 feet of wire. The wire coating was smooth.

EXAMPLE 3

The same wire line was used as in Example 2 except that a 3¼ inch extruder was used to furnish additional melt capacity, along with a high speed caterpillar haul-off and take-up, and a coating speed of 900 f.p.m. of 10-mil thick coating was used. A total of 32,300 feet of wire was jacketed with nylon at 517° F. with the coating thickness varying between 8 and 12 mils, and a total of two spark failures in 32,300 feet of wire. This wire coating was smooth.

EXAMPLE 4

The same wire line and coating conditions as in Example 3 were used except that in separate runs the following thermoplastic resins were used as the coating resin: low density polyethylene, high density polyethylene, and an ionomer resin. In each case, smooth, relatively defect-free coatings in wire lengths of 2000 feet and more were produced.

EXAMPLE 5

A series of experiments were carried out using a wire line equipped with pay-off, quench trough, capstan, take-up, and 2-inch extruder equipped with a wire coating cross-heat in which the guide tube contains internal guide structure similar to that of FIG. 1. The section 52 of the guider tip had an I.D. of .034 inch and an O.D. of .050 inch. Section 38 of the converging section of the guide tube had an I.D. of .060 inch and an O.D. of .090 inch, and the die orifice was .130 I.D. The elongate material to be coated consisted of a 630 denier nylon monofilament around which were spirally wrapped four 1 x 18 mil copper tapes. Finished diameter of the wire was .018 inch. Polyamide resin was applied as the insulation to the elongate material from 500 to 1000 f.p.m. and stock temperatures from 480 to 550° F. Wire centering and uniformity were good for coating thicknesses from 4 to 10 mils and no problems were encountered with abrasion or vibration, causing wire breakage, or with resin freeze-off in the die. All wire coatings were smooth.

As many apparently widely different embodiments of this invention may be made without departing from the spirit and scope thereof, it is to be understood that this invention is not limited to the specific embodiments thereof except as defined in the appended claims.

What we claim is:

1. In an apparatus comprising an extrusion die and a guide tube positioned with said extrusion die to form a tubing die for extruding tubing of thermoplastic resin about elongate material passing through said guide tube and out its outlet, with said guide tube communicating a vacuum therewithin with said tubing exterior of said tubing die for drawing said tubing down to coat said elongate material, the improvement comprising a guide structure positioned within said guide tube and dividing the interior of said guide tube into a guide passage for said elongate material and an annular chamber for said vacuum, said passage terminating in laterally spaced relationship within said outlet of said guide tube, whereby the vacuum from the vacuum chamber within said guide tube communicates with the tubing exterior of said tubing die through the space between said guide passage and said outlet of said guide tube, said guide structure including a tubular portion forming the portion of the passage terminating in said laterally spaced relationship to form a surrounding annular space between said outlet of said guide tube and said tubular portion, said guide structure including means positioned rearwardly from said tubular portion and in contact with the inner wall of said guide tube for positioning said guide structure therewithin.

2. The apparatus of claim 1 wherein said guide passage is removably positioned within said guide tube and the removable positioning of said guide passage is obtained by said guide passage having a longitudinally slotted section forming a slip-fit with the interior surface of said guide tube to enable said guide passage to be slid rearwardly through the rearward end of said guide tube.

3. The apparatus of claim 1 wherein said guide structure includes tubular means including said tubular portion positioned longitudinally within said guide tube, at least a portion of said tubular means being spaced from the interior surface of said guide tube, with the resultant space between said tubular means and said guide tube forming said annular vacuum chamber, and with the bore of said tubular means forming said guide passage, and means for communicating a vacuum with said vacuum chamber.

4. The apparatus of claim 3 wherein the vacuum communication means includes an opening in the sidewall of said guide tube.

5. The apparatus of claim 3 wherein the clearance between said bore and said elongate material is sufficiently small so as to prevent chattering of said elongate material while passing through said guide tube.

6. The apparatus of claim 3 wherein said tubular means includes a guider tip having said tubular portion positioned within the outlet of said guide tube and serving as a portion of said guide passage and forming said means for positioning said guide structure, a longitudinally slotted tubular portion positioned rearwardly of said first mentioned tubular portion, with the slotted tubular portion contacting the interior wall of said guide tube to obtain the positioning of said guider tip therewithin.

7. The apparatus of claim 1 wherein said guide passage isolates the vacuum of said vacuum chamber from said elongate material while said elongate material is within said guide tube.

8. The extrusion apparatus of claim 1 wherein said means for positioning positions said tubular portion concentrically within said guide tube outlet.

9. The extrusion apparatus of claim 1 wherein said elongate material is wire.

10. The extrusion apparatus of claim 1 wherein said elongate material is glass filament.

11. The extrusion apparatus of claim 1 wherein said elongate material is thermoplastic resin of a higher melting temperature than that of said first mentioned resin.

12. The apparatus of claim 1 wherein said tubular portion terminates in or beyond the plane of the outlet of said guide tube.

References Cited

UNITED STATES PATENTS 2,286,922   6/1942   Muller.
2,341,731   2/1944   MacGregor et al.

FOREIGN PATENTS 218,292   8/1958   Australia.

ANDREW R. JUHASZ, Primary Examiner

L. GILDEN, Assistant Examiner

U.S. Cl. X.R.

18—DIG 60